UNITED STATES PATENT OFFICE.

FRED M. LOCKE, OF VICTOR, NEW YORK.

INSULATING COMPOSITION.

1,091,678. Specification of Letters Patent. Patented Mar. 31, 1914.

No Drawing. Application filed May 19, 1909. Serial No. 497,095.

*To all whom it may concern:*

Be it known that I, FRED M. LOCKE, a citizen of the United States, and resident of Victor, in the county of Ontario and State of New York, have invented certain new and useful Improvements in Insulating Compositions, of which the following is a specification.

This invention relates to a plastic composition adapted for various purposes, but particularly for use as electric insulating material.

The object of the invention is to produce a composition which shall have both a greater electrical resistance than ordinary glass or earthen compositions, and at the same time great toughness and resistance to changes in temperature.

Glass, porcelain, and glazing materials as ordinarily compounded contain certain comparatively refractory materials which may be designated as bases, and certain comparatively fusible elements commonly termed fluxes. Among the latter boron compounds and various metal salts, such as zinc oxid, iron oxid, sodium carbonate &c., are commonly used. I have discovered, however, that most of such materials used as fluxes are deleterious to a composition with respect both to insulating properties and to mechanical toughness and resistance to changes in temperature. I have further discovered that, in connection with a base consisting chiefly of a fusible aluminum silicate such as potash-feldspar or common clay, a flux may be used consisting entirely, or substantially entirely, of a fusible boron compound such, for example, as borax, colemanite, or boracic acid, and that the composition so produced is much superior to those produced by the use of fluxes of other character both with respect to insulating qualities and with respect to its mechanical qualities.

This composition may vary widely in the proportions in which its elements are used, and it may be made either opaque or transparent, according to the degree of heat to which it is subjected in firing. It has been found possible to direct a blow-pipe flame upon a thick body of such material until a hole is melted through the same without the production of cracks. Furthermore, plates or blocks of the material may be dipped alternately into ice water and into boiling water, without cracking or injuring them. The electrical resistance has also been demonstrated to be higher than that of either glass or porcelain.

In practice I have found that suitable proportions for the elements of my composition are as follows: feldspar 100 parts, boracic acid from 5 to 100 parts, in accordance with the toughness and electrical resistance required.

I am aware that it has been previously proposed to make an insulating composition including both feldspar and borax as elements, but in such composition these elements have been used merely as a flux for asbestos, clay and other substances, the principal characteristic of the composition resulting from the latter substances. So far as I know, it is new to produce a homogeneous body consisting wholly, or substantially wholly, of fusible aluminum silicate and fusible boron compound, and I am the first, so far as I am aware, to discover the useful combination of mechanical and electrical characteristics which this substance possesses, and which give it value as insulating material.

I claim:—

1. An insulating compound consisting of an aluminum silicate and a boron compound fused together in a homogeneous body.

2. An insulating compound consisting of an aluminum silicate having a boron compound incorporated therein.

FRED M. LOCKE.

Witnesses:
D. GURNEE,
L. THON.